(No Model.)　　　　　　　　　　　　　　　　2 Sheets—Sheet 1.
J. A. MENGEL.
SEED PLANTER.
No. 547,521.　　　　　　　　Patented Oct. 8, 1895.
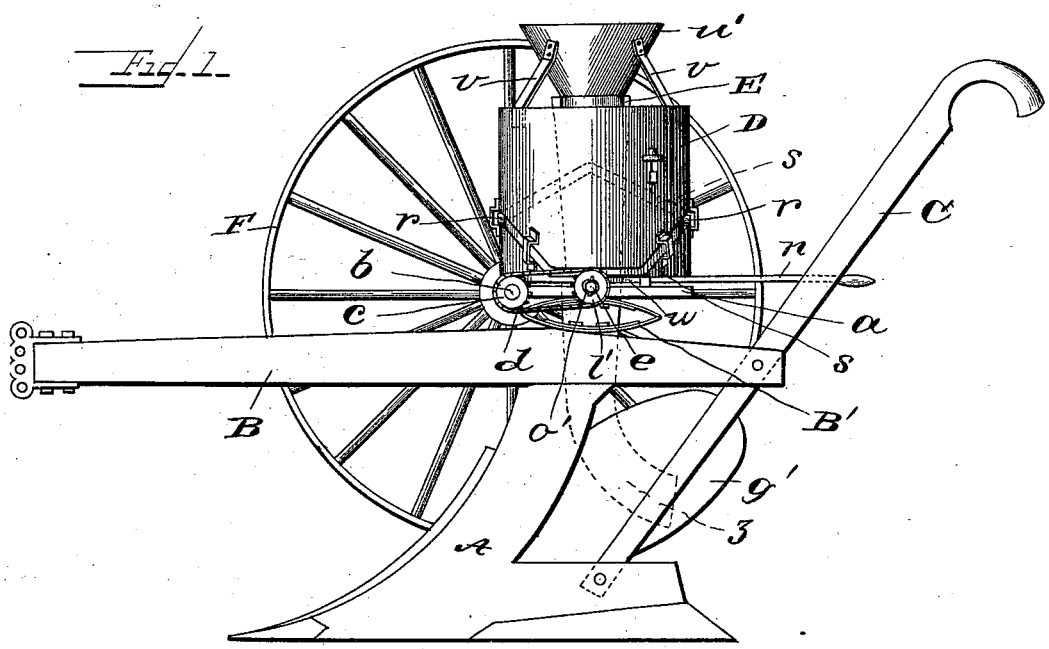
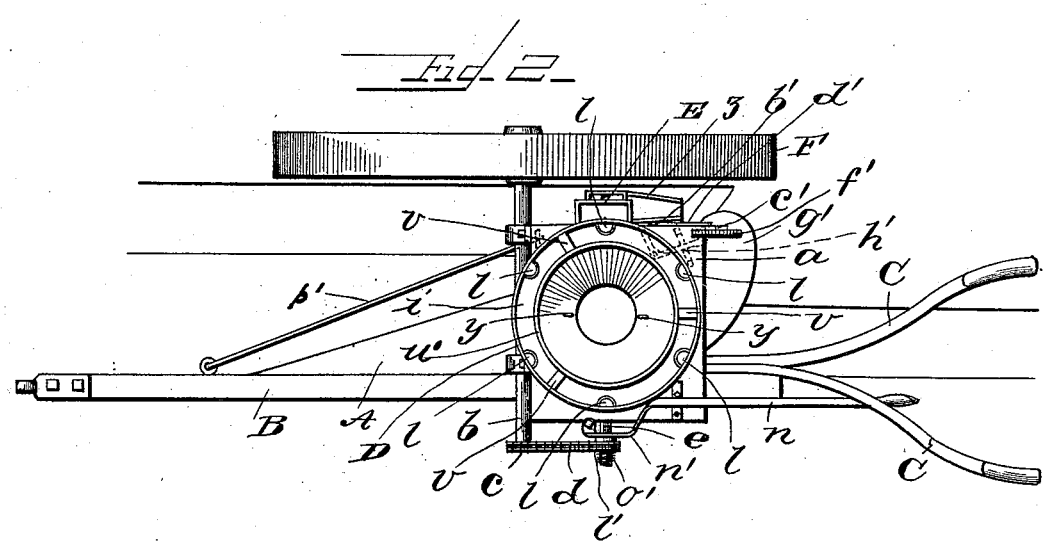
Witnesses
Inventor
Joseph A. Mengel
By D. C. Reinohl
Attorney (No Model.) 2 Sheets—Sheet 2.
J. A. MENGEL.
SEED PLANTER.
No. 547,521. Patented Oct. 8, 1895.
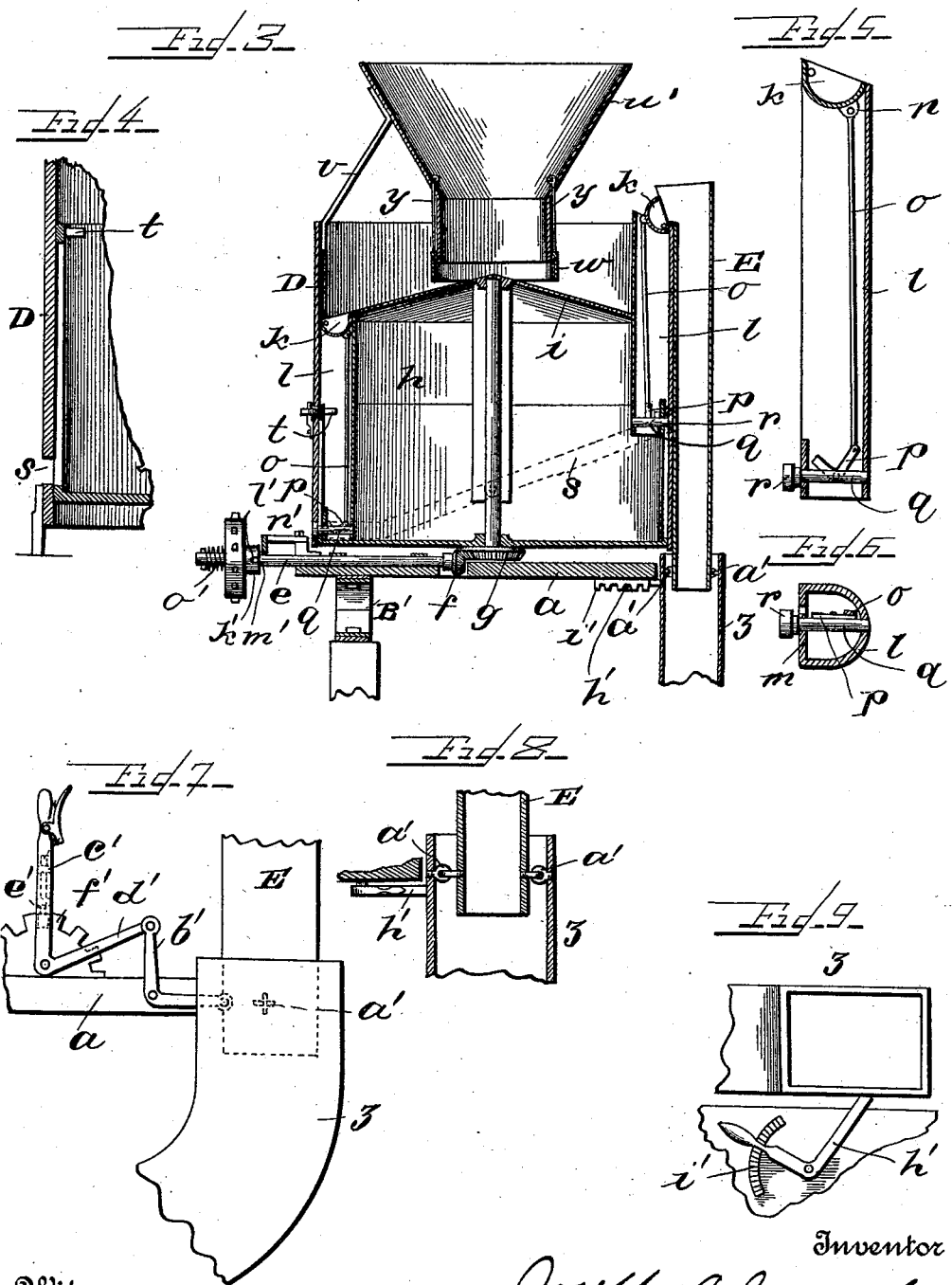
Witnesses
G. A. Tauberschmidt
D. Weimer Reinohl
Inventor
Joseph A. Mengel.
By D. C. Reinohl
Attorney

UNITED STATES PATENT OFFICE.

JOSEPH A. MENGEL, OF McKEANSBURG, ASSIGNOR OF TWO-THIRDS TO GEORGE H. GERBER, OF POTTSVILLE, AND GEORGE K. BINKLEY, OF ORWIGSBURG, PENNSYLVANIA.

SEED-PLANTER.

SPECIFICATION forming part of Letters Patent No. 547,521, dated October 8, 1895.

Application filed January 15, 1895. Serial No. 535,020. (No model.)

*To all whom it may concern:*

Be it known that I, JOSEPH A. MENGEL, a citizen of the United States, residing at McKeansburg, in the county of Schuylkill and State of Pennsylvania, have invented certain new and useful Improvements in Seed-Planters; and I do hereby declare the following to be a full, clear, and exact description of the invention, such as will enable others skilled in the art to which it appertains to make and use the same.

My present invention relates to seed-planters, and has for its object certain improvements in construction, whereby the planter may be attached to an ordinary plow, and the invention will be fully disclosed in the following specification and claims.

In the accompanying drawings, which form part of this specification, Figure 1 represents a side elevation of a plow with my improved seed-planter attached; Fig. 2, a top plan view of the same; Fig. 3, a vertical transverse section, on an enlarged scale, of the hopper, the seed-cups and their cylinders and the seed-conductor, and the operating mechanism shown in side elevation; Fig. 4, an enlarged section of the hopper; Fig. 5, a vertical section of one of the seed-cylinders; Fig. 6, an inverted view of the same; Fig. 7, a side elevation of part of the seed-conductor and the mechanism for raising and lowering the same; Fig. 8, a vertical transverse section of the seed-conductor, showing the manner of connecting the two sections; and Fig 9, a top plan view of the lower section of the seed-conductor detached and the mechanism for adjusting it laterally.

Reference being had to the drawings and the letters thereon, A indicates a plow, which may be of any improved form of construction, and which is provided with a beam B and handles C.

D indicates the hopper of my seed-planter and is in the form of a cylinder, which is supported upon a frame, base, or platform $a$, one end of which rests upon the plow-beam B, with a spring B' interposed between the platform and the beam to take the shock or other motion of the plow and prevent spilling the seed out of the seed-cups. This attachment of the frame may be made on the side of the plow-beam, if preferred. To the frame $a$ is attached a shaft or axle $b$, on one end of which is a wheel F, which, with the plow-beam, supports the hopper. The axle $b$ is provided at its opposite or inner end with a sprocket-wheel $c$ or other pulley, from which power is transmitted by a belt $d$ to shaft $e$, on the inner end of which is a miter gear-wheel $f$, which engages a master-wheel $g$ on the inner cylinder $h$ of the hopper, as shown in Fig. 3. The inner cylinder $h$ is provided with a conical top $i$, which forms the bottom of the hopper and causes the seed to gravitate outward from the center and downward toward the seed-cups $k$. The seed-cups are supported in vertically-reciprocating cylinders $l$, which are provided with a flat side $m$, as shown in Fig. 6, and the cups are pivotally connected at $n$ to a rod $o$, which is attached at its lower end to a bell-crank lever $p$, which is pivotally connected to a shaft or stud $q$, which extends through the cylinder and is provided with a friction-roller $r$, which engages a cam groove or track $s$ in the outer cylinder of the hopper. The cylinders $l$ are disposed around the inner cylinder $h$ and are raised and lowered by the stud $q$ as it travels in the groove or track $s$ in the outer cylinder as the inner cylinder is revolved, and the seed-cups are tripped to discharge the seed when their cylinders are adjacent to the seed-conductor E by the free end of the lever $p$ engaging the tripping-pin $t$, as shown in Fig. 3.

The cam groove or track $s$ is provided with a flat portion $u$, about equal to one-half of the length of the inclines of the groove or one-third of the whole of the groove or track to afford time for the seed-cup to be filled from the hopper and avoid the possibility of the seed-cups rising without a proper supply of seed. The cam-groove is shown in Figs. 1 and 3, and as the inner cylinder $h$ revolves the stud $q$ runs in the cam-groove and raises and lowers the cylinders $l$ and the seed-cups.

Above the bottom of the hopper is a funnel-shaped reservoir $u'$, which is supported on the hopper by braces $v$ and is provided with a vertically-movable gate $w$, operated by rods $y$ to regulate the supply of seed to the hopper in quantity sufficient to provide seed for the cups when they and their supporting-cylinders are flush with the bottom of the hopper.

The seed-conductor E is attached at its upper end to the hopper in any suitable manner and is made in two sections, the lower one $z$ of which is pivotally connected to the upper section, as shown in Figs. 3, 7, and 8 at $a'$ $a'$, so that the said lower section $z$ may be adjusted in planes at a right angle to the upper section, the longitudinal adjustment being effected by a bell-crank lever $b'$, a handle $c'$, having an arm $d'$, and a dog $e'$ to engage a rack $f'$, as shown in Fig. 7, and this adjustment of the lower section $z$ of the seed-conveyer determines the point in the furrow at which the seed shall be dropped with reference to its being covered by the soil displaced by the mold-board $g'$ of the plow, as shown in Fig. 1.

The lateral adjustment of the section $z$ is for the purpose of determining the place in the furrow at which the seed shall be dropped, whether in the center of the furrow according to the depth of soil with which the seed shall be covered, and is effected by a bell-crank lever $h'$, which engages the inner side of the section $z$ and is secured by a rack $i'$, as shown in Fig. 9.

The sprocket-wheel $c$ is provided with a collar $k'$, having slot $l'$, which engages a pin $m'$ in the shaft $e$ to form a clutch to throw the revolving inner cylinder $h$ and the seed-cups into and out of operation. The wheel $c$ is thrown out of connection with the pin $m'$ by a lever $n'$, which extends back to one of the plow-handles, as shown in Figs 1 and 2, and is automatically thrown into connection with said pin by the spring $o'$ on the end of the shaft $e$.

To the beam of the plow is attached a draft-rod $p'$, which extends back to and engages the frame of the planter, as shown in Fig. 2.

Having thus fully described my invention, what I claim is—

1. The combination of a plow, a seed planter on one side of the plow and supported at one end by a wheel and at the opposite end by the beam of the plow, a draft rod connecting the frame of the planter to the plow-beam and said planter provided with a hopper, reciprocating seed-cups and a seed conveyer provided with means for effecting longitudinal and lateral adjustment thereof.

2. The combination of a plow, a seed planter on one side of the plow and supported at one end by a wheel and at the opposite end by the beam of the plow, a draft rod connecting the frame of the planter to the plow-beam and said planter having a hopper, a revoluble bottom for the hopper, a cam groove or track, studs engaging said track and connected to reciprocating cylinders, seed cups in the upper end of said cylinders and a seed conveyer.

3. A seed planter provided with a seed hopper, reciprocating seed cups and a cam groove or track having a flat or horizontal portion intermediate two inclines in said track, in combination with a seed conductor.

4. A seed planter provided with a seed hopper, reciprocating seed cups and a cam groove or track, in combination with a seed conveyer connected to one side of said hopper and provided with means for adjusting said conveyer vertically, longitudinally, and laterally.

In testimony whereof I affix my signature in presence of two witnesses.

JOSEPH A. MENGEL.

Witnesses:
D. C. REINOHL,
D. WEIMER REINOHL.